(12) United States Patent
Mogush

(10) Patent No.: US 9,197,648 B2
(45) Date of Patent: Nov. 24, 2015

(54) SYSTEM AND METHOD FOR VERIFYING THE IDENTITY OF AN INTERNET USER

(71) Applicant: Joe Mogush, Rancho Santa Margarita, CA (US)

(72) Inventor: Joe Mogush, Rancho Santa Margarita, CA (US)

( * ) Notice: Subject to any disclaimer, the term of this patent is extended or adjusted under 35 U.S.C. 154(b) by 276 days.

(21) Appl. No.: 13/867,875

(22) Filed: Apr. 22, 2013

(65) Prior Publication Data
US 2014/0317689 A1    Oct. 23, 2014

(51) Int. Cl.
*G06F 7/04* (2006.01)
*H04L 29/06* (2006.01)

(52) U.S. Cl.
CPC ................. *H04L 63/126* (2013.01)

(58) Field of Classification Search
CPC .................................................. H04L 63/126
USPC ............................................................ 726/4
See application file for complete search history.

(56) References Cited

U.S. PATENT DOCUMENTS

| | | | |
|---|---|---|---|
| 7,383,230 B2* | 6/2008 | Wolff | 705/53 |
| 7,467,401 B2* | 12/2008 | Cicchitto | 726/4 |
| 7,949,764 B2* | 5/2011 | Zellner | 709/227 |
| 8,819,413 B1* | 8/2014 | Hernacki et al. | 713/155 |
| 2009/0049530 A1* | 2/2009 | Zellner | 726/4 |
| 2013/0191898 A1* | 7/2013 | Kraft | 726/6 |

* cited by examiner

*Primary Examiner* — Teshome Hailu
(74) *Attorney, Agent, or Firm* — John D. Tran; Rhema Law Group

(57) ABSTRACT

A system and method for verifying the identity of an Internet user are disclosed. In at least one embodiment, a central computing system is configured for receiving and processing data related to the user. Using a computing device in communication with the computing system, a user account is created containing the user's basic information, including an email address belonging to the user. Upon validating the user's email address, the system obtains the user's name, address and last four digits of their social security number and, using that information, attempts to gather additional information related to the user from an at least one consumer records database in communication with the computing system. The user is then presented with an at least one identity verification question based on the additional information gathered. Upon the user correctly answering an acceptable percentage of the verification questions, the user's identity is considered to be verified.

19 Claims, 4 Drawing Sheets

SYSTEM AND METHOD FOR VERIFYING THE IDENTITY OF AN INTERNET USER

RELATED APPLICATIONS

Not applicable.

INCORPORATION BY REFERENCE

Applicant(s) hereby incorporate herein by reference any and all U.S. patents and U.S. patent applications cited or referred to in this application.

BACKGROUND OF THE INVENTION

1. Field of the Invention

Aspects of this invention relate generally to digital security, and more particularly to a system and method for verifying the identity of an Internet user.

2. Description of Related Art

By way of some background, in the emerging global economy, e-commerce has increasingly become a necessary component of business strategy and a strong catalyst for economic development. Not only has it allowed consumers to locate and purchase virtually any good or service imaginable, regardless of their geographic locations, but it has also decreased the overhead for many businesses, as having a traditional "brick and mortar" establishment is no longer required. In other words, e-commerce has significantly impacted the simplicity of exchanging money for goods and/or services. When it comes to online transactions via the Internet, companies have historically had no choice but to rely upon the accuracy of the information provided to them by consumers. Given the relative anonymity that is afforded by the Internet, along with the relative ease with which one may create a fake persona (including a fake email address), this has proven to be a fundamental flaw in the security of the Internet that is being exploited by identity thieves countless times every day. This weakness enables criminals to use stolen credit card numbers to purchase products from online retailers, apply for new credit cards and loans in someone else's name, and redirect another person's sensitive financial information to themselves. These security flaws arise primarily because confirmations, receipts, and notices are sent to the fake email address provided by whomever initiates a given transaction, rather than the email address of the person who's information is being fraudulently used. The actual consumer remains unaware that he or she has been victimized until long after the fact.

In addition to the above e-commerce issues, online predators and cyber-stalkers also use fake email addresses as a mask to cover their true identities. Cloaked in anonymity, they are able to register on dating and social media websites in order to locate their victims and perpetrate serious crimes, including murder and rape. Website owners have found themselves embroiled in lawsuits brought against them by victims and their families for failing to do more to protect their members.

Additionally, government agencies impose a wide range of regulatory obligations various industries to help ensure privacy and security of sensitive information, among other things. The relative ease with which fraudsters and online predators are able to manipulate the system through the establishment of fake email addresses also greatly increases the difficulty and expense of compliance with these regulations. A wide range of industries are affected by such regulations. For example, banks and financial institutions are required to comply with numerous due diligence requirements imposed by U.S. and international "know your customer" laws, the U.S. Patriot Act, and other regulations designed to protect banks from being used by criminal enterprises for money laundering activities. The privacy rules under the federal Health Insurance Portability and Accountability Act of 1996 ("HIPAA") requires health care providers to undertake a series of administrative, physical, and technical safeguards for covered entities to assure the confidentiality, integrity, and availability of sensitive electronic health information. In law firms, communications between attorneys and their clients are subject to legal privilege and must be held in strict confidence. An accidental disclosure of that information can subject attorneys to severe disciplinary sanctions. Operators of websites that cater to children are required to comply with the Children's Online Privacy Protection Act of 1998 ("COPPA") which, among other things, requires them to obtain verifiable parental consent before processing a child's registration. Until now, the only choice available to website owners to comply with this aspect of COPPA was to send an email to the address provided to them on the registration form. Children often "game the system" by establishing a fake email address through which to confirm that consent.

Furthermore, As of Sep. 30, 2012, the Internal Revenue Service ("IRS") had almost 650,000 identity theft cases in inventory. The victims of tax-related identity theft suffer extraordinary inconveniences and, in many cases, hardships. In general, more than 75 percent of U.S. taxpayers receive refunds, with the amounts averaging roughly $3,000. Identity theft victims are generally unable to receive their significant and sometimes urgently needed tax refunds until the IRS resolves their cases, which is now taking upwards of six months or longer.

Thus, there remains a need for a way to better prevent such fraudulent online activities. Aspects of the present invention fulfill these needs and provide further related advantages as described in the following summary.

SUMMARY OF THE INVENTION

Aspects of the present invention teach certain benefits in construction and use which give rise to the exemplary advantages described below.

The present invention solves the problems described above by providing a system and method for verifying the identity of an Internet user. In at least one embodiment, a central computing system is configured for receiving and processing data related to the user. Using a computing device in communication with the computing system, a user account is set up for the user containing the user's basic information, including an email address belonging to the user. Upon validating the user's email address, the system obtains the user's name, address and last four digits of their social security number and, using that information, attempts to gather additional information related to the user from an at least one consumer records database in communication with the computing system. The user is then presented with an at least one identity verification question based on the additional information gathered. Upon the user correctly answering an acceptable percentage of the verification questions, the user's identity is deemed to have been verified. Thus, participating vendors will have peace of mind in knowing that the user is real and valid, and will have reliable proof that the user actually initiated or approved of a given transaction.

A primary objective inherent in the above described system and method of use is to provide advantages not taught by the prior art.

Another objective is to provide such a system and associated methods that are capable of assisting to prevent fraudulent online activities.

Another objective is to provide such a system and associated methods that are capable of being utilized by any type of vendor.

Another objective is to provide such a system and associated methods that are capable of allowing online transactions to be verified and authorized by either email or phone.

Other features and advantages of aspects of the present invention will become apparent from the following more detailed description, taken in conjunction with the accompanying drawings, which illustrate, by way of example, the principles of aspects of the invention.

BRIEF DESCRIPTION OF THE DRAWINGS

The accompanying drawings illustrate aspects of the present invention. In such drawings.

The above described drawing figures illustrate aspects of the invention in at least one of its exemplary embodiments, which are further defined in detail in the following description. Features, elements, and aspects of the invention that are referenced by the same numerals in different figures represent the same, equivalent, or similar features, elements, or aspects, in accordance with one or more embodiments.

DETAILED DESCRIPTION OF THE INVENTION

The above described drawing figures illustrate aspects of the invention in at least one of its exemplary embodiments, which are further defined in detail in the following description.

Figure 1:
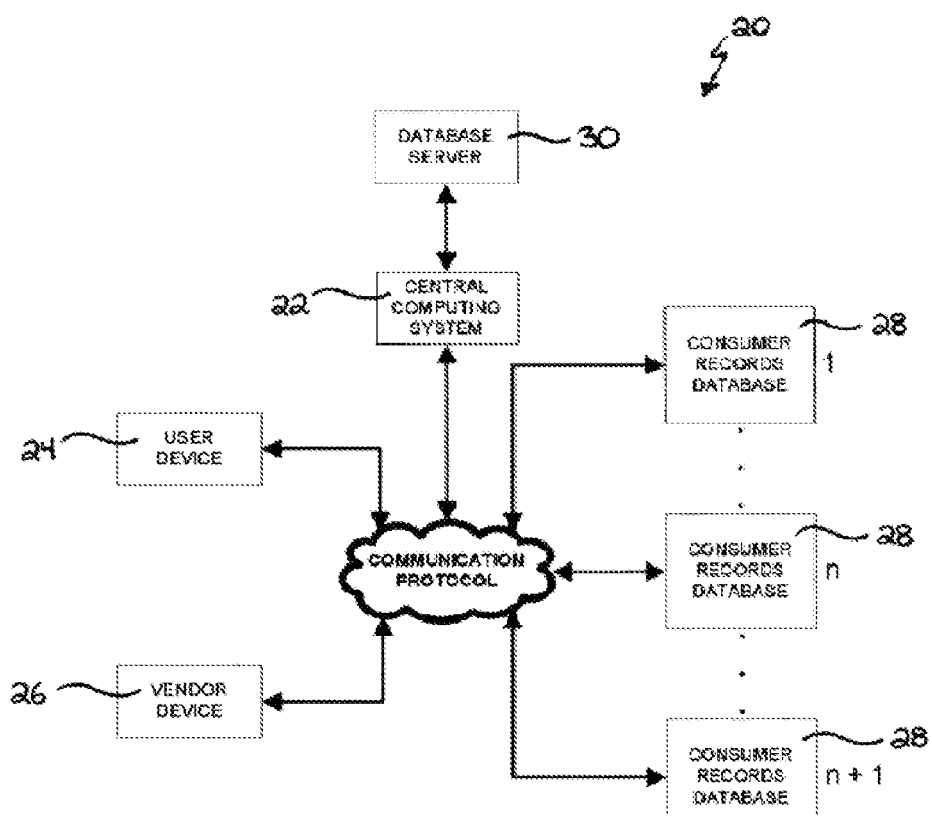
FIG. 1 is a schematic view of an exemplary system for verifying the identity of an Internet user, in accordance with at least one embodiment.

Turning now to FIG. 1, there is shown a schematic view of an exemplary system 20 for verifying the identity of an Internet user, in accordance with at least one embodiment. The system 20 provides, in at least one embodiment, a central computing system 22 configured for receiving and processing data related to the user in order to verify the identity of the user, an at least one user device 24 in selective communication with the computing system 22, an at least one vendor device 26 also in selective communication with the computing system 22, and an at least one consumer records database 28 also in selective communication with the computing system 22. Additionally, in at least one embodiment, a database server 30 is in communication with the computing system 22 and configured for selectively storing said data related to the user, such as user account information.

At the outset, it should be noted that the means for allowing communication between each of the computing system 22, at least one user device 24, at least one vendor device 26, at least one consumer records database, and database server 30 may be any wired- or wireless-based communication protocol (or combination of protocols) now known or later developed. As such, the present invention should not be read as being limited to any one particular type of communication protocol, even though certain exemplary protocols may be mentioned herein for illustrative purposes. It should also be noted that the terms "user device" and "vendor device" are intended to include any type of computing device now known or later developed, such as desktop computers, smartphones, laptop computers, tablet computers, etc.

With continued reference to FIG. 1, in the exemplary embodiment, the computing system 22 contains the hardware and software necessary to carry out the exemplary method for verifying the identity of the user as described herein. Furthermore, in at least one embodiment, the computing system 22 comprises a plurality of computing devices selectively working in concert with one another to carry out the exemplary method for verifying the identity of the user as described herein. The user device 24 is in the possession of the user who is desirous of acquiring some good or service (hereinafter referred to generally as a "product") from a participating vendor. It should be noted that the term "vendor" is intended to include any type of entity in the business of providing goods and/or services to consumers, including but not limited to retailers, service providers, lenders, website owners, etc. The vendor device 26, then, is in the possession of the participating vendor from whom the user is desirous of acquiring said product.

Figure 2:
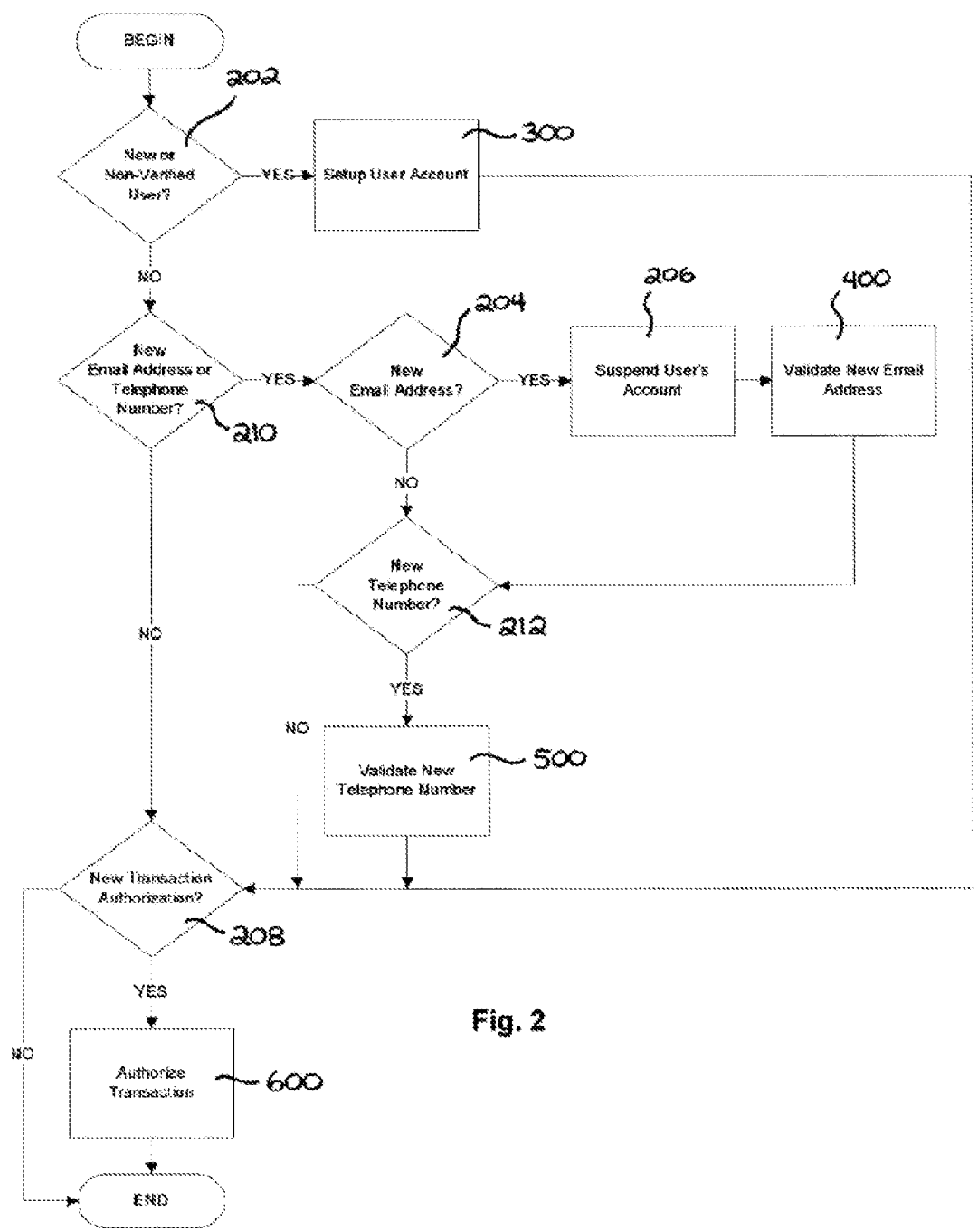
FIG. 2 is a flow diagram of an exemplary method for verifying the identity of an Internet user, in accordance with at least one embodiment.

In the exemplary embodiment, as illustrated in the flow diagram of FIG. 2, upon the user desiring to acquire the product from the vendor, and assuming the user is new to the system 20 or at least not yet properly verified (202), the user is first required to properly register with the system 20 by setting up an account (300). In at least one embodiment, where the user is attempting to acquire the product from the vendor remotely via the Internet, the user is able to register with the computing system 22 via the user device 24—either through an interface provided by the computing system 22 or an interface provided by the vendor. In at least one further embodiment, where the user is attempting to acquire the product locally at the vendor's place of business, the user is able to register with the computing system 22 via the vendor device 26 or the user device 24. In at least one still further embodiment, the vendor may itself register the user with the computing system 22 via the vendor device 26, assuming that the user has provided the vendor with all necessary basic information to do so. In the exemplary embodiment, the basic information required includes various details related to the user, including but not limited to the user's full legal name, date of birth residential address, email address, and at least one telephone number.

Figure 3:
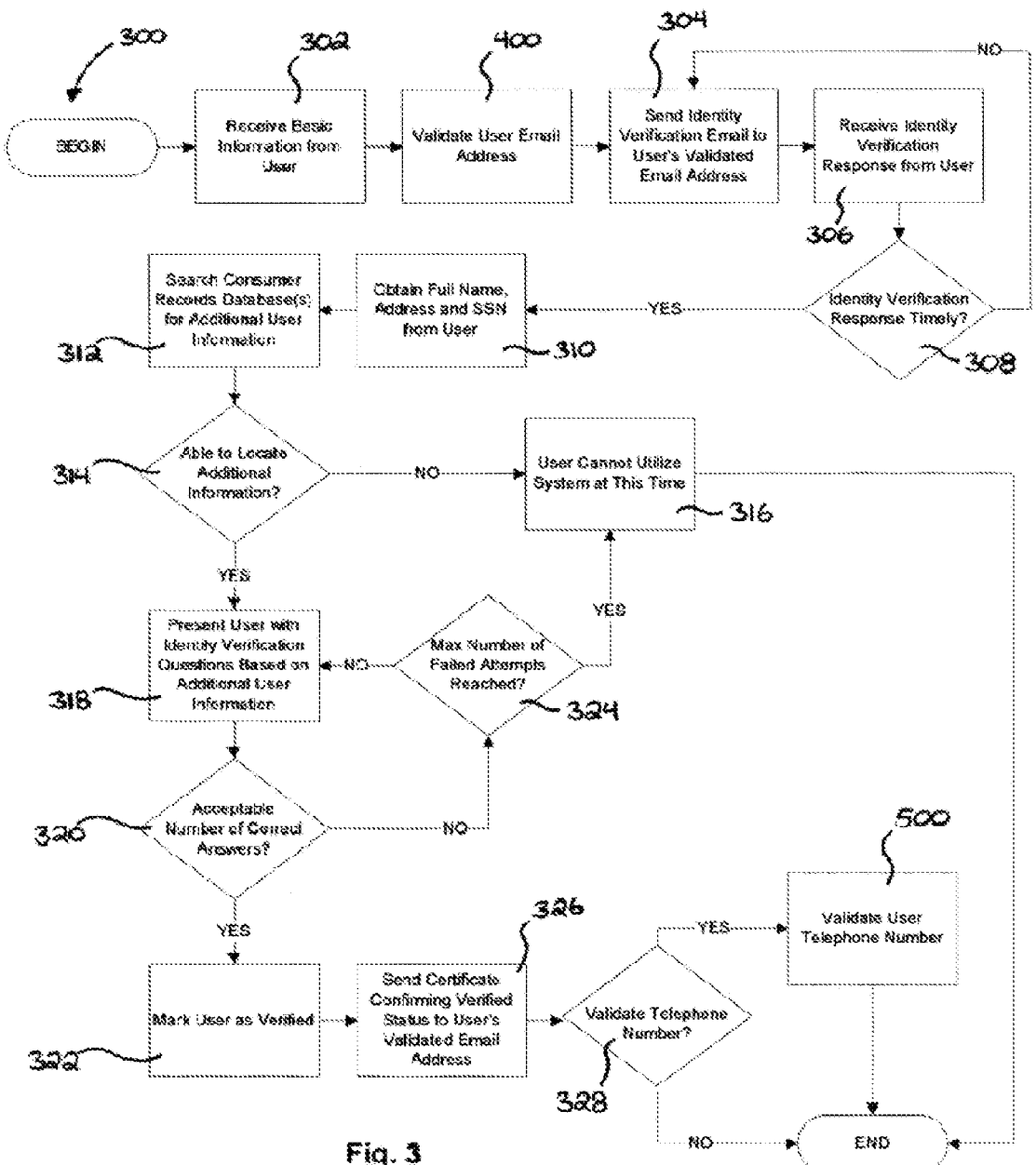
FIG. 3 is a flow diagram of an exemplary method for setting up a user account in the exemplary system, in accordance with at least one embodiment.
Figure 4:
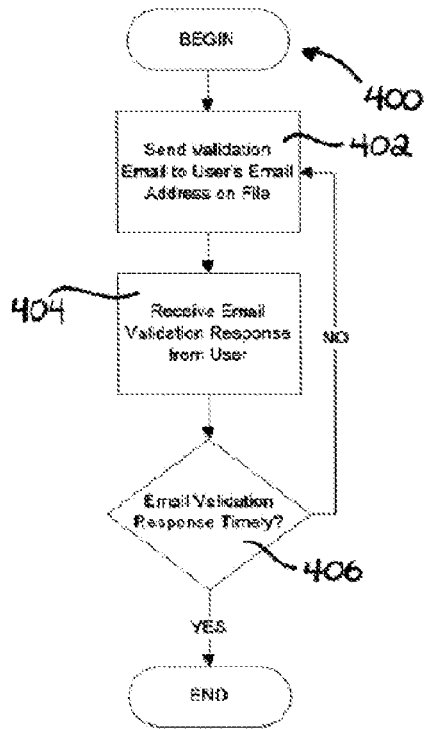
FIG. 4 is a flow diagram of an exemplary method for validating a user's email address, in accordance with at least one embodiment.

As illustrated in the flow diagrams of FIGS. 3 and 4, upon providing the computing system 22 with the user's basic information (302), the computing system 22 first validates the user's email address that was provided during the registration process (400). To do so, the computing system 22 sends a validation email to the email address that was provided (402), at which point the user is required to appropriately relay to the computing system 22 the validation response contained therein (404). In the exemplary embodiment, the validation email contains a unique hyperlink that the user must click on in order to activate their account with the system 20. As shown in step 406, the hyperlink is preferably only made available for a limited period of time (for example, 24 hours), after which point it will expire, requiring the user to either start the registration process over again (300) or request a new validation email (402)—depending on the context in which the system 20 is implemented. In an alternate embodiment, the validation email contains a unique code that must be input into the computing system 22 by the user in order to activate their account with the system 20. In still further embodiments, other methods for accomplishing this particular functionality, now known or later developed, may be substituted. In any event, this step allows the computing system 22 to verify the validity of the user's registered email address associated with their account.

Referring again to FIG. 2, after registering with the system 20 and validating their email address, should the user subsequently change their email address (204), the computing system shall suspend the user's account (206) until the new email address has been validated through the same steps 402, 404 and 406 described above.

Referring again to FIG. 3, in the exemplary embodiment, once the user's email address has been validated (400), the computing system 22 sends a follow-up email to the validated email address (304) containing a unique hyperlink that the user must click on in order to verify their identity with the system 20 (306). As shown in step 308, similar to the hyperlink in the email validation email and depending on the context in which the system 20 is implemented, the hyperlink in the identify verification email is preferably only made available for a limited period of time (for example, five minutes), after which point it will expire, requiring the user to request a new identity verification email (304). Upon timely clicking the hyperlink (306), the user is redirected to a secured verification webpage hosted by the computing system 22. Through the webpage, the computing system 22 first requires the user to provide their full legal name, current residential address, and last four digits of their social security number (310). It should be noted that, in at least one embodiment, the full legal name, current residential address, and last four digits of the social security number are instead obtained from the user during the initial registration process (302) described above. Upon the user providing that information, in addition to the basic information the user provided during the initial registration process (302), the computing system 22 is able to search the at least one consumer records database 28 for further information on the user (312)—namely, information that only the user would know (other than the entity maintaining the particular consumer records database 28, of course). On that note, in the exemplary embodiment, the at least one consumer records database 28 is maintained by one or more third parties, such as Experian® or Equifax®; however, in at least one alternate embodiment, the at least one consumer records database 28 is securely maintained by the system 20. Additionally, in at least one embodiment, the computing system 22 preferably gathers information from more than one consumer records database 28 so as to better ensure that only the user will be privy to the information stored across those multiple sources. Furthermore, in at least one embodiment, the information gathered is classified as Level 1 non-FCRA ("Free Credit Reporting Act") data, thereby allowing any type of vendor to utilize the system 20.

With continued reference to FIG. 3, if the computing system 22 is unable to locate any information through the at least one consumer records database 28 (314), the identity verification process will be unable to continue and the user (along with the vendor, if applicable) will be notified that the user will be unable to utilize the system 20 (316). Otherwise, if the computing system 22 is able to obtain information from the at least one consumer records database 28, the computing system 22 uses that information to present to the user a plurality of multiple choice questions related to the information (318) so as to determine whether the user knows the details of that information. In at least one embodiment, at least one of the questions is a diversional (i.e., fake) question, as studies have shown that diversional questions significantly help to eliminate fraud. In the exemplary embodiment, the computing system 22 poses a total of four questions to the user, with two of those questions being diversional questions. However, in further embodiments, the computing system 22 may pose any number of questions—both true and diversional. Some exemplary questions could include: "Please select the model year of the vehicle you most recently purchased or leased;" "Which of the following is the highest level of education you have completed;" "Which of the following represents the last four digits of your primary checking account number;" or "Please select the year in which you were born." In still further embodiments, other types of question formats, now known or later developed, may be used, such as true/false or fill-in-the-blank.

In the exemplary embodiment, if the user answers all questions correctly (320), the computing system 22 will accept the user's identity as being verified (322); otherwise, should the user answer one or more questions incorrectly, the computing system 22 will reject the user's identity verification (316) and notify the user accordingly (along with the vendor, if applicable). In further embodiments, the computing system 22 may allow for a certain percentage of incorrect answers. As shown in step 324, in at least one embodiment, the computing system 22 only allows the user a maximum of three failed attempts at verifying their identity during any given 48-hour period of time.

Again, should the user correctly answer an acceptable number of questions (320), the user's identity is deemed to have been verified by the system 20 and the user is considered to be a trusted and valid consumer (322). Accordingly, in at least one embodiment, the computing system 22 emails a certificate to the user confirming their verified status (326). Additionally, in at least one embodiment, the vendor is notified as well. Thus, the vendor will have peace of mind in knowing that the user is real and valid, and will have reliable proof that the user actually initiated or approved of a given transaction. Additionally, given that the system 20 validates the user's email address, the vendor is able to establish a secure line of communication with the user so as to secure the user's approval for future transactions.

Figure 6:
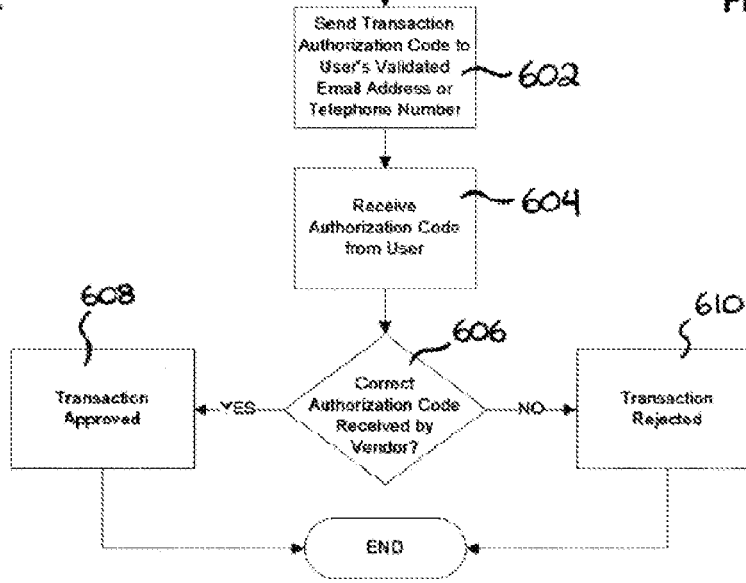
FIG. 6 is a flow diagram of an exemplary method for authorizing a transaction between a user and a participating vendor, in accordance with at least one embodiment.

Referring again to FIG. 2, once the user's identity has been verified by the system 20, should the user enter into any future transactions with participating vendors (208), rather than having to go through the identity verification process again, the computing system 22 simply is able to simply authorize the transaction (600) upon being notified by the vendor of the pending transaction with the user and verifying that the user's identity has previously been validated (202) along with their email address (210). In a bit more detail and as illustrated in the flow diagram of FIG. 6, the computing system 22 first sends a unique transaction authorization code to the user (602). In the exemplary embodiment, the transaction authorization code is sent in an email to the user's validated email address, which the user must then provide to the vendor (604)—typically input into the appropriate field of the vendor's checkout form. The vendor confirms with the computing system 22 whether the authorization code provided by the user is correct (606) and, if it is, the transaction is approved (608); otherwise, if the authorization code is incorrect, the transaction is rejected (610). In an alternate embodiment, the computing system 22 sends a transaction confirmation email to the user's validated email address containing a unique hyperlink that the user must click in order to verify and authorize the transaction.

Figure 5:
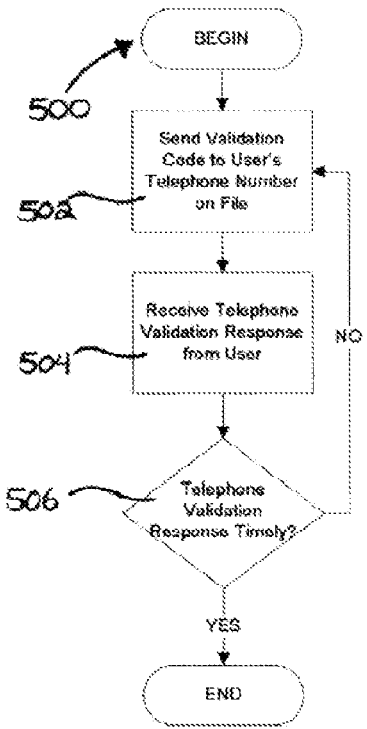
FIG. 5 is a flow diagram of an exemplary method for validating a user's telephone number, in accordance with at least one embodiment.

Referring again to FIG. 3, in the exemplary embodiment, once the user's identity has been verified by the system 20 (322) and assuming the user (or vendor) provided the computing system 22 with a telephone number during the registration process, the computing system 22 provides the user the option to validate their telephone number as well (328). In a bit more detail, and as illustrated in the flow diagram of FIG. 5, the computing system 22 validates the telephone number (500) by first sending a validation code to the user's telephone number (502), at which point the user is required to appropriately relay to the computing system 22 the validation response contained therein (504). Where the telephone number is for a landline, the computing system 22 calls the telephone number and plays an audio message containing the unique code. Where the telephone number is for a mobile phone, the computing system 22 sends a validation SMS message (i.e., text message) containing the unique code. Alternatively, similar to a landline telephone number, the computing system 22 may call the mobile phone and play an audio message containing the unique code. As shown in step 506, similar to the email validation and identity verification steps described above, and depending on the context in which the system 20 is implemented, the unique telephone number validation code is preferably only made available for a limited period of time (for example, five minutes), after which point it will expire, requiring the user to request a new telephone number validation code (502).

Referring again to FIG. 2, once the user's telephone number has also been validated by the system 20, the user may opt to receive transaction authorization codes (602) via telephone rather than email. In at least one such embodiment, during the checkout process of a transaction with a vendor, the vendor first notifies the computing system 22 of the pending transaction with the user (208). The computing system 22 verifies that the user's identity has previously been validated (202) along with their telephone number (210), at which point the computing system 22 then sends a unique code to the user's telephone number—either via SMS or audio message—(602) which the user must then input into the appropriate field of the vendor's checkout form (604) in order to verify (606) and approve (608) the transaction. Additionally, should the user subsequently change their telephone number (212), the computing system 22 shall validate the user's new telephone number through the same steps 502, 504 and 506 described above.

In at least one embodiment, the computing system 22 provides an online interface configured for allowing the user to manage their account information and view a detailed history of previously authorized transactions.

To summarize, regarding the exemplary embodiments of the present invention as shown and described herein, it will be appreciated that a system and method for verifying the identity of an Internet user is disclosed. Because the principles of the invention may be practiced in a number of configurations beyond those shown and described, it is to be understood that the invention is not in any way limited by the exemplary embodiments, but is generally directed to a system and method for verifying the identity of an Internet user and is able to take numerous forms to do so without departing from the spirit and scope of the invention. It will also be appreciated by those skilled in the art that the present invention is not limited to the particular geometries and materials of construction disclosed, but may instead entail other functionally comparable structures or materials, now known or later developed, without departing from the spirit and scope of the invention. Furthermore, the various features of each of the above-described embodiments may be combined in any logical manner and are intended to be included within the scope of the present invention.

It should be understood that the logic code, programs, modules, processes, methods, and the order in which the respective elements of each method are performed are purely exemplary. Depending on the implementation, they may be performed in any order or in parallel, unless indicated otherwise in the present disclosure. Furthermore, the logic code is not related, or limited to any particular programming language, and may comprise one or more modules that execute on one or more processors in a distributed, non-distributed, or multiprocessing environment.

The method as described above may be used in the fabrication of integrated circuit chips. The resulting integrated circuit chips can be distributed by the fabricator in raw wafer form (that is, as a single wafer that has multiple unpackaged chips), as a bare die, or in a packaged form. In the latter case, the chip is mounted in a single chip package (such as a plastic carrier, with leads that are affixed to a motherboard or other higher level carrier) or in a multi-chip package (such as a ceramic carrier that has either or both surface interconnections or buried interconnections). In any case, the chip is then integrated with other chips, discrete circuit elements, and/or other signal processing devices as part of either (a) an intermediate product, such as a motherboard, or (b) an end product. The end product can be any product that includes integrated circuit chips, ranging from toys and other low-end applications to advanced computer products having a display, a keyboard or other input device, and a central processor.

While aspects of the invention have been described with reference to at least one exemplary embodiment, it is to be clearly understood by those skilled in the art that the invention is not limited thereto. Rather, the scope of the invention is to be interpreted only in conjunction with the appended claims and it is made clear, here, that the inventor(s) believe that the claimed subject matter is the invention.

What is claimed is:

1. A method for verifying the identity of an Internet user, the method comprising the steps of:

implementing a central computing system configured for receiving and processing data related to a user basic information in order to verify the identity of the user;

utilizing a computing device in communication with the central computing system to set up a user account;

configuring a database server in communication with the central computing system for storing the user account and user basic information;

providing the central computing system with the user's basic information, including an email address belonging to the user;

validating, by said central computing system, the user's email address;

sending, by said central computing system, a follow-up email containing a click on unique hyperlink to the email address belonging to the user;

determining whether the hyperlink is clicked on by the user within a predetermined period of time;

redirecting the user to a secure verification webpage hosted by the computing system upon determining the hyperlink is clicked on within said predetermined period of time;

obtaining, at said secure verification webpage, the user's name, address and last four digits of their social security number upon determining said hyperlink is clicked on within said predetermined period of time;

gathering additional information related to the user from at least a plurality of external consumer records databases, wherein said gathering step is configured to provide additional information privy to the user of stored additional information in said plurality of external consumer records database, in which the additional information comprising privy information known only to the user;

storing the gathered additional information related to the user in an at least one internal consumer records database in communication with the central computing system;

searching the at least one internal consumer records database in communication with the computing system for the stored additional information of the user, presenting the user with an at least one identity verification question based on the additional information gathered from the at least one internal consumer records database, wherein the at least one identity verification question comprising at least one diversional question not related to the user and at least one true question based on the additional information known only to the user;

assigning a verified status to the user's account upon the user correctly answering a predetermined percentage of the at least one identity verification question sending a certificate to the user confirming the verified status of the user's account; and sending a notification to the vendor of the verified status of the user's account, thereby, the vendor have a reliable proof that the user initiated or approved of at least one of single transaction and multiple transactions.

2. The method of claim 1, further comprising the steps of: sending an identity verification email to the user's validated email address, wherein the follow-up email is said identity verification email; and receiving an identity verification response from the user, as provided by the identity verification email, wherein said identity verification response is clicking on the hyperlink by the user within the predetermined period of time.

3. The method of claim 2, further comprising the step of determining whether the identity verification response was timely received within the predetermined period of time at the computing system.

4. The method of claim 3, further comprising the step of sending a new identity verification email upon determining that the identity verification response was not timely received.

5. The method of claim 1, wherein the step of validating the user's email address comprising the steps of:

sending a validation email to the user's email address, wherein the follow-up email is said validation email; and
receiving an email validation response from the user, as provided by the validation email, wherein said email validation response is the hyperlink clicked on by the user within the predetermined period of time.

6. The method of claim 5, further comprising the step of determining whether the email validation response was timely received at the computing system within the predetermined amount of time.

7. The method of claim 6, further comprising the step of sending a new validation email to the user's email address upon determining that the email validation response was not timely received at the computing system within the predetermined amount of time.

8. The method of claim 1, further comprising the step of rejecting the user's account upon the computing system being unable to locate in the at least one consumer records database any additional information related to the user.

9. The method of claim 1, further comprising the steps of: temporarily suspending the user's account upon determining that the user's email address has been modified;

sending a new validation email to the user's new email address;

receiving an acceptable email validation response from the user, as provided by the new validation email; and lifting the suspension on the user's account.

10. The method of claim 1, wherein the step of presenting the user with an at least one identity verification question further comprises the step of presenting the user with at least one of a plurality of diversional questions not related to the user and a plurality of true questions based on the additional information known only to the user.

11. The method of claim 1, further comprising the step of sending a certificate to the user and notifying the vendor confirming approval of said at least one of a single transaction and multiple transactions.

12. The method of claim 1, further comprising the step of validating a telephone number belonging to the user.

13. The method of claim 12, further comprising the steps of:

providing the computing system with the user's telephone number, sending a validation code to the user's telephone number, receiving a telephone validation response from the user, and validating the user's telephone number upon determining that the telephone validation response matches the validation code.

14. A method for enabling a vendor to authorize a pending transaction as entered into by an Internet user, the method comprising the steps of:

implementing a central computing system configured for receiving and processing data related to the pending transaction and the user in order to verify the identity of the user and enable the vendor to authorize the pending transaction;

using a computing device in communication with the central computing system to validate an email address belonging to the user;

notifying the central computing system of the pending transaction;

obtaining, at a secure verification webpage hosted by the central computing system, the user's name, address and last four digits of the user social security number;

searching at least one of a single consumer records database and a plurality of consumer databases, in communication with the computing system for additional information on the user, in which the additional information comprising information known only to the user;

gathering the additional information on the user in an at least one internal consumer records database in communication with the central computing system;

presenting the user with at least one identity verification question based on the additional information from the at least one internal consumer records database, wherein the at least one identity verification question comprising at least two or more diversional questions not related to the user and at least two or more true questions based on the additional information known only to the user;

assigning a verified status to the user's account upon the user correctly answering the at least two or more true questions based on the additional information known only to the user;

sending a transaction authorization code to the user and the vendor upon assigning a verified status to the user's account;

receiving a transaction authorization code response from the user, and approving the transaction upon determining that the authorization code response as transmitted by the user matches the transaction authorization code sent to the vendor.

15. The method of claim 14, wherein the step of sending a transaction authorization code to the user further comprises the step of sending the transaction authorization code to the user's validated email address.

16. The method of claim 14, further comprising the step of using the computing device in communication with the computing system to validate a telephone number belonging to the user.

17. The method of claim 16, wherein the step of sending a transaction authorization code to the user further comprises the step of sending the transaction authorization code to the user's validated telephone number.

18. The method of claim 14, wherein the step of receiving a transaction code response from the user further comprises the step of providing the transaction authorization code to the vendor.

19. A method for verifying the identity of an Internet user for the purpose of authorizing a transaction as entered into by the user and a vendor, the method consisting the steps of:

implementing a central computing system configured for receiving and processing data related to the authorizing of the transaction and user information for verifying the identity of the user;

setting up a user account for the user with at least one user device in communication with the central computing system;

configuring a database server in communication with the central computing system for storing the user account and information;

providing the computing system with an email address belonging to the user;

sending, by the computing system, a validation email to the email address belonging to the user, the validation email comprising a unique code that the user enters into the central computing system to activate the user account;

determining an acceptable email validation response time from the user, as provided by the validation email;

redirecting the user to a secure verification webpage hosted by the computing system upon a predetermined email validation response time from the user;

obtaining, at the secure verification webpage, the user's name, address and last four digits of the user social security number, searching at least one of a single consumer records database and a plurality of consumer databases, in communication with the computing system for additional information on the user, in which the additional information comprising information known only to the user;

gathering the additional information on the user in an at least one internal consumer records database in communication with the central computing system;

presenting the user with at least one identity verification question based on the additional information from the at least one internal consumer records database, wherein the at least one identity verification question comprising at least one or more diversional questions and at least one or more true questions related to the information known only to the user;

assigning a verified status to the user's account upon the user correctly answering a predetermined percentage of the at least one identity verification question;

denying the user further access to the computing system upon the user failing to provide the predetermined percentage of correct answers to the at least one identity verification question and reaching a maximum number of failed attempts during a predetermined period of time;

notifying the user and vendor of the verified status of the user's account;

sending, by the computing system, a transaction authorization code to the vendor and the user's validated email address upon assigning a verified status to the user's account;

inputting into a vendor checkout form, the transaction authorization code sent to the user's validated email address; and approving, by the vendor, the transaction as entered into by the user and the vendor upon determining that the authorization code in the vendor checkout form matches the transaction authorization code sent to the vendor.

* * * * *